United States Patent [19]

Anderson

[11] 3,755,259

[45] Aug. 28, 1973

[54] POLYMERIC LATICES AND SODIUM ALUMINATE

[75] Inventor: Donald R. Anderson, Oswego, Ill.

[73] Assignee: Nalco Chemical Company, Chicago, Ill.

[22] Filed: Jan. 31, 1972

[21] Appl. No.: 222,340

[52] U.S. Cl....... 260/29.6 M, 117/152, 117/161 UZ
[51] Int. Cl. ........................................... C08f 37/00
[58] Field of Search .............................. 260/29.6 M

[56] References Cited
UNITED STATES PATENTS

| | | | |
|---|---|---|---|
| 3,056,757 | 10/1959 | Rokowitz | 20/29.6 |
| 3,057,811 | 10/1962 | Trachterbury et al. | 260/29.6 |
| 3,511,798 | 5/1970 | Jsoarson et al. | 260/29.6 |
| 3,624,019 | 11/1971 | Anderson | 260/29.6 |

Primary Examiner—Melvin Goldstein
Assistant Examiner—Peter F. Kulkosky
Attorney—John G. Premo et al.

[57] ABSTRACT

A coating composition comprising from 1 to 99 percent by weight of sodium aluminate and from 1 to 99 percent by weight of a water-in-oil emulsion, said emulsion containing dispersed therein from 1 to 35 percent by weight of a finely divided water-soluble anionic vinyl addition polymer.

4 Claims, No Drawings

POLYMERIC LATICES AND SODIUM ALUMINATE

INTRODUCTION

Many attempts have been made to prepare coating compositions in the form of films which may be cast on such surfaces as glass, metals, or they may be formed on the other substrates such as a wide variety of fibers such as cloth, paper and the like. The coatings can be formed into suitable coatings for the protection of a variety of surfaces against the attack of many chemical substances.

INVENTION

The invention relates to a coating composition comprising:

A. Sodium aluminate having a concentration from 1 to 99 percent by weight; and

B. A water-in-oil emulsion having a concentration from 1 to 99 percent by weight, said emulsion containing dispersed therein from 0.1 to 35 percent by weight of a finely divided water-soluble anionic vinyl addition polymer.

The preferred coating composition comprises:

A. Sodium aluminate having a concentration from 10 to 40 percent by weight; and

B. A water-in-oil emulsion having a concentration from 60 to 90 percent by weight, said emulsion containing dispersed therein from 0.1 to 35 percent by weight of a finely divided water-soluble anionic vinyl addition polymer.

The water-soluble anionic vinyl addition polymers that are used in the practice of the invention may be illustrated by the following list of polymers:

TABLE I

| No. | Polymer |
|---|---|
| 1 | Polyacrylic acid-sodium salt |
| 2 | Polymethacrylic acid-sodium salt |
| 3 | Maleic anhydride-vinyl acetete copolymer |
| 4 | Polyvinyl methyl ether-maleic anhydride copolymer |
| 5 | Methacrylic acid-acrylamide copolymer |
| 6 | Polyacrylic acid |
| 7 | Isopropenyl acetate-maleic anhydride sodium salt |
| 8 | Itaconic acid-vinyl acetate |
| 9 | Methyl styrene-maleic anhydride sodium salt |
| 10 | Styrene-maleic anhydride |
| 11 | Methylmethacrylate-maleic anhydride sodium salt |
| 12 | Acrylic acid-styrene |
| 13 | Acrylamide-acrylic acid (5 percent by weight) |
| 14 | Acrylamide-acrylic acid (50 percent by weight) |
| 15 | Polystyrene sulfonic acid |
| 16 | Acrylamide-acrylic acid (80 percent by weight) |

The above polymers may vary in molecular weight. They may be as low as 10,000 or as high as 12 million or more. In many of the more useful applications, which will be more fully discussed hereafter, the molecular weight will be greater than 1 million.

The invention contemplates using as preferred water-soluble anionic vinyl addition polymers the homo- and copolymers of acrylic acid as well as the water-soluble salts thereof.

A preferred water-soluble anionic vinyl addition polymer of this invention is acrylamide-sodium acrylate copolymer wherein the ratio of acrylamide to sodium acrylate is 65:35.

Another preferred water-soluble anionic vinyl addition polymer is an acrylamide-methacrylic acid copolymer in a ratio of 90:10.

THE VINYL ADDITION POLYMER POLYMERIC LATEX

The invention contemplates utilizing the water-soluble vinyl addition polymers in the form of water-in-oil emulsion which contains dispersed therein the water-soluble anionic vinyl addition polymer. Emulsions of this type are prepared by dispersing the anionic vinyl addition polymer into a water-in-oil emulsion. These polymers as produced by most manufacturing processes are in the form of powders or lump-like agglomerates of varying particle size. It is desirable that the particles, before being placed into the emulsion, be comminuted by grinding, abrading or the like so that their average particle size is less than 5 millimeters and preferably is within the range of 1 to 5 microns. After the powders have been comminuted, they may be dispersed into the water-in-oil emulsion by means of agitation provided by such devices as stirrers, shakers and the like. To be commercially practical, the amount of polymer in the emulsion should be at least 2 percent by weight. The invention contemplates using emulsions containing between 5 to 75 percent by weight with preferred emulsions having a polymer concentration within the range of 10 to 45 percent by weight. In some cases the starting emulsions are converted to suspensions due to the nature and the amount of the polymer present therein.

From a commercial standpoint it is beneficial that the polymer emulsions thus described be stable, yet at the same time contain relatively large amounts of polymers. One method of insuring that the polymers do not precipitate when dispersed in the emulsion is that the particle size of the polymer be as small as possible. Thus polymers dispersed in the emulsifiers are quite stable when the particle size is within the range of 5 millimicrons up to about 5 microns. To produce particle sizes within these limitations, spray dryers with appropriate size nozzles may be used. It also is possible to prepare the polymer-containing emulsion of the water-soluble anionic vinyl addition polymers directly from the vinyl monomers from which these polymers are synthesized. Such polymer-containing emulsions may be synthesized by using the water-in-oil emulsion polymerization technique set forth in U.S. Pat. No. 3,284,393. The teachings of this patent comprise forming a water-in-oil emulsion of water-soluble ethylenic unsaturated monomers. The emulsion is formed by utilizing a water-in-oil emulsifying agent. To this monomer is added a free radical-type polymerization catalyst and then heat is applied under free radical-forming conditions to form water-soluble polymer latices. The polymeric latices produced by this patent are relatively unstable and frequently must be treated with additional emulsifiers to render the products stable.

The water-in-oil emulsions used to prepare the above polymers may be formulated by any number of known techniques.

The oils used in preparing these emulsions may be selected from a large group of organic liquids which include liquid hydrocarbons and substituted liquid hydrocarbons.

A preferred group of organic liquids are the hydrocarbon liquids which include both aromatic and aliphatic compounds. Thus, such organic hydrocarbon liquids as benzene, xylene, toluene, mineral oils, kerosenes, naphthas and, in certain instances, petrolatums may be used. A particularly useful oil from the standpoint of its physical and chemical properties is the branch-chain isoparaffinic solvent sold by Humble Oil and Refining Company under the Tradename "ISOPAR M." Typical specifications of this narrow-cut isoparaffinic solvent are set forth below in TABLE II.

TABLE II

| Specification Properties | Minimum | Maximum | Test Method |
|---|---|---|---|
| Gravity, API at 60/60°F | 48.0 | 51.0 | ASTM D 287 |
| Color, Saybolt | 30 | | ASTM D 156 |
| Aniline point, °F | 185 | | ASTM D 611 |
| sulfur, ppm | | 10 | ASTM D 1266[1] |
| distillation, °F | | | ASTM D 86 |
| IBP | 400 | 410 | |
| Dry point | | 496 | |
| Flash point, °F (Pensky-Martens closed cup) | 160 | | ASTM D 93 |

[1]Nephelometric mod.

The amount of oil used in relation to the water to prepare the emulsion may be varied over wide ranges. As a general rule, the amount of oil-to-water may vary between 5:1 to 1:10 with preferable emulsions being prepared in the ratio of 1:1 to 1:10. These ratios are illustrative of emulsions that can be prepared, although it should be understood that the invention is not limited thereby.

The emulsions may be prepared by any number of techniques. For example, the emulsions may be prepared by using high speed agitation or ultrasonic techniques. In most instances, however, it is desirable that the emulsion be a stable emulsion and to achieve this end it is often necessary to employ an oil soluble emulsifying agent. The amount of emulsifying agent to provide an emulsion will have to be determined by routine experimentation. As a general rule it may be said that the amount of oil soluble emulsifier may range from 0.1 to 30 percent by weight based on the weight of the oil. To produce stable emulsions the amount of emulsifier will normally be within the range of 12 to 20 percent by weight of the oil.

Rather than provide a listing of suitable emulsifiers, recommended as being satisfactory are the so-called low HLB materials which are well documented in the literature and are summarized in the Atlas HLB Surfactant Selector. Although these emulsifiers are useful in producing good water-in-oil emulsions, other surfactants may be used as long as they are capable of producing these emulsions. For instance, we have found that certain high HLB surfactants are capable of producing stable water-in-oil emulsions. A typical low HLB emulsifier is sorbitan monooleate.

PREPARATION OF THE COATING COMPOUND

Once latices containing the water-soluble anionic vinyl addition polymers are prepared the sodium aluminate is combined therewith by the utilization of conventional mixing techniques. Preferably the sodium aluminate is in the form of an aqueous solution containing 25 to 75 percent by weight and is added to the polymeric latex. After uniformly mixing the two components there results a liquid dispersion of a water-soluble vinyl polymer emulsion and sodium aluminate.

To illustrate the preparation of the coating composition, a variety of emulsions were prepared containing different water-soluble vinyl addition polymers. These emulsions are set forth below in TABLE III.

TABLE III

| Composition No. | Water Phase (% by Wt) | Oil Phase(% by Wt) | Polymer | % In polymer Emulsion size Range particle |
|---|---|---|---|---|
| I | 72 | 28(I) | 93% Acrylamide 7% Methacrylic Acid | 35% 0.05–7.0μ |
| II | 72 | 28(I) | 93% Acrylamide 7% Methacrylic Acid | 35% 0.05–7.0μ |
| III | 72 | 28(T) | 70% Acrylamide 30% Acrylic Acid | 35% 0.05–7.0μ |
| IV | 67 | 33(I) | 93% Acrylamide 7% Methacrylic Acid | 32% <30μ |
| V | 70 | 30(I) | 70% Acrylamide 30% Acrylic Acid | 34% 0.01–10μ |
| VI | 71 | 29(I) | Sodium Polyacrylate | 37% <1 mm. |

I = ISOPAR M
T = Toluene

COMPOSITION A

To emulsion in Table III, Composition Number I, there was added 50 percent by weight of an aqueous solution containing 42 percent by weight of sodium aluminate. After approximately 10 minutes, the emulsion had inverted and the polymer was in solution forming a gel-type material.

COMPOSITION B

To 100 grams of Composition Number VI in Table III, there was added 100 grams of 42 percent aqueous solution of sodium aluminate. The polymer went into solution within 10 minutes forming a gel-type structure.

To illustrate other novel dispersions of the invention, TABLE IV is presented below:

TABLE IV

| compo sition | latex from table III | % by wt. | NA aluminate | % Na aluminate (by wt) | Time to form gel structure |
|---|---|---|---|---|---|
| C | I | 60 | 42% solution | 40 | 8 min. |
| D | VI | 50 | 42% solution | 50 | 10 min. |
| E | V | 70 | 42% solution | 30 | 5 min. |

INVERSION OF THE DISPERSION

The finished coating composition is stable generally for only a short period of time. Upon dispersion of sodium aluminate in the polymeric latex the emulsion begins to invert thereby releasing the finely-divided water-soluble anionic vinyl addition polymer into solution. This reaction between the highly alkaline sodium aluminate solution and the polymeric latex produces within a matter of minutes a reaction product which may be described as a three-dimensional, water and hydrocarbon liquid insoluble gel-like structure. These gel-like structures are spongy, porous, and are substantially incapable of adherence to most hydrophobic surfaces. They may be prepared from dilute solutions of the liquid dispersions in the form of films which may be cast on such surfaces as glass, metals, or they may be formed on to other substrates such as a wide variety of fibers such as cloth, paper and the like.

The sodium aluminate containing polymeric latex may be inverted by any number of means. A surfactant may be added to either the polymer-containing emulsion or to the sodium aluminate into which it is to be added. The placement of a surfactant into the sodium aluminate causes the emulsion to rapidly invert and release the polymer in the form of an aqueous solution. When this technique is used to hasten the inversion of the sodium aluminate-polymer-containing emulsion the amount of surfactant may vary over a range of 0.01 to 50 percent based on polymer. Good inversion often occurs within the range of 1.0 to 10 percent based on polymer.

The preferred surfactants are hydrophilic and are further characterized as being water-soluble. Any hydrophilic-type surfactant such as ethoxylated nonyl phenols, ethoxylated nonyl phenol formaldehyde resin, dioctyl esters of sodium sulfosuccinate, and octyl phenol polyethoxy ethanol can be used.

Other surfactants that may be employed include the soaps such as sodium and potassium myristate, laurate, palmitate, oleate, stearate, resinate, and hydroabietate, the alkali metal alkyl or alkylene sulfates, such as sodium lauryl sulfate, potassium stearyl sulfate, the alkali metal alkyl or alkylene sulfonates, such as sodium lauryl sulfonate, potassium stearyl sulfonate, and sodium cetyl sulfonate, sulfonated mineral oil, as well as the ammonium salts thereof; and salts of higher means like lauryl amine hydrochloride, and stearyl amine hydrobromide.

Any anionic, cationic, or nonionic compound can be used as the surfactant.

In addition to using the water-soluble surfactants described above, other surfactants may be used such as silicones, clays and the like which are included as surfactants since, in certain instances, they tend to invert the emulsion even though they are not water-soluble.

In other specific cases the surfactant may be directly added to the polymer-containing emulsion; thereby rendering it self-inverting upon contact with water which contains the sodium aluminate.

Other techniques for increasing the inversion of the emulsions include the use of agitation, high voltage electrical fields and heat. For any particular polymer-containing emulsion a suitable method for its inversion may be readily determined by routine experimentation.

The Compositions A through E, as prepared above, formed an opaque rubbery-like gel that was insuluble in water and in most common organic solvents, e.g., pentane, methanol, xylene and the like.

When the sodium aluminate was added to the polymeric latex, the dispersion was not stable after a short period of time. The emulsion began to invert and the polymer was released into the solution. The gel was allowed to air dry for 3 days. At the end of this time the structure became more rubbery and had shrunken considerably in size due to loss of liquid. It was still semi-flexible and was difficult to pull apart.

Composition C was roller coated onto a sheet of glass and a piece of cotton cloth. After setting the produced film was washed with pentane to remove the organic solvent. The films produced on both the glass and the cotton cloth rendered the surfaces resistant to oil staining.

It is believed that the gel-like structures are formed when the isoelectric point of the inverted water-soluble vinyl addition polymer and the sodium aluminate is reached. The exact amount of either the polymer or sodium aluminate to effectively neutralize one another is difficult to determine. When the ratios of either ingredient exceed the amount needed to exactly neutralize the other substantial quantities of the component in excess is believed to be entrapped by the gel-like structure. Thus, by varying excesses of the polymer or sodium aluminate it is possible to produce a neutral gel-like structure which has entrained within its interstices excesses of polymeric material that will impart strength and resilience to the gel-like structure. This effect allows the structures to be coated or adherently bonded to many hydrophilic surfaces by means of ionic or polar attractive forces.

In preparing the porous gel-like structures from the liquid dispersions of the invention it is possible to add other chemicals to the dispersion just prior to or at the time of inversion. When such a technique is used it is possible to entrap many chemicals within the gel-like structure which would be released under certain circumstances. For instance, slow release of corrosion inhibitors, bactericides, herbicides, and the like may be prepared.

Having thus described my invention, I claim:

1. A coating composition comprising:
   A. Sodium aluminate having a concentration of from 10 to 40 percent by weight; and
   B. A water-in-oil emulsion having a concentration from 60–90 percent by weight, said water-in-oil emulsion being comprised of:
      1. water ranging between 5 and 40 percent by weight;
      2. a water-soluble anionic vinyl addition polymer having a concentration between 20 and 40 percent by weight;
      3. a hydrophobic liquid ranging between 5 and 35 percent by weight; and
      4. a water-in-oil emulsifying agent having a concentration between 0.1 and 30 percent by weight.

2. The coating composition of claim 1 wherein the polymer is an acrylamide-sodium acrylate copolymer.

3. The coating composition of claim 2 wherein the weight ratio of acrylamide to sodium acrylate is 65:35.

4. The coating composition of claim 1 wherein the polymer is an acrylamide-methacrylic acid copolymer.

* * * * *